Jan. 20, 1931. A. L. NYLANDER 1,789,370
CLIPPERS
Filed Dec. 2, 1929
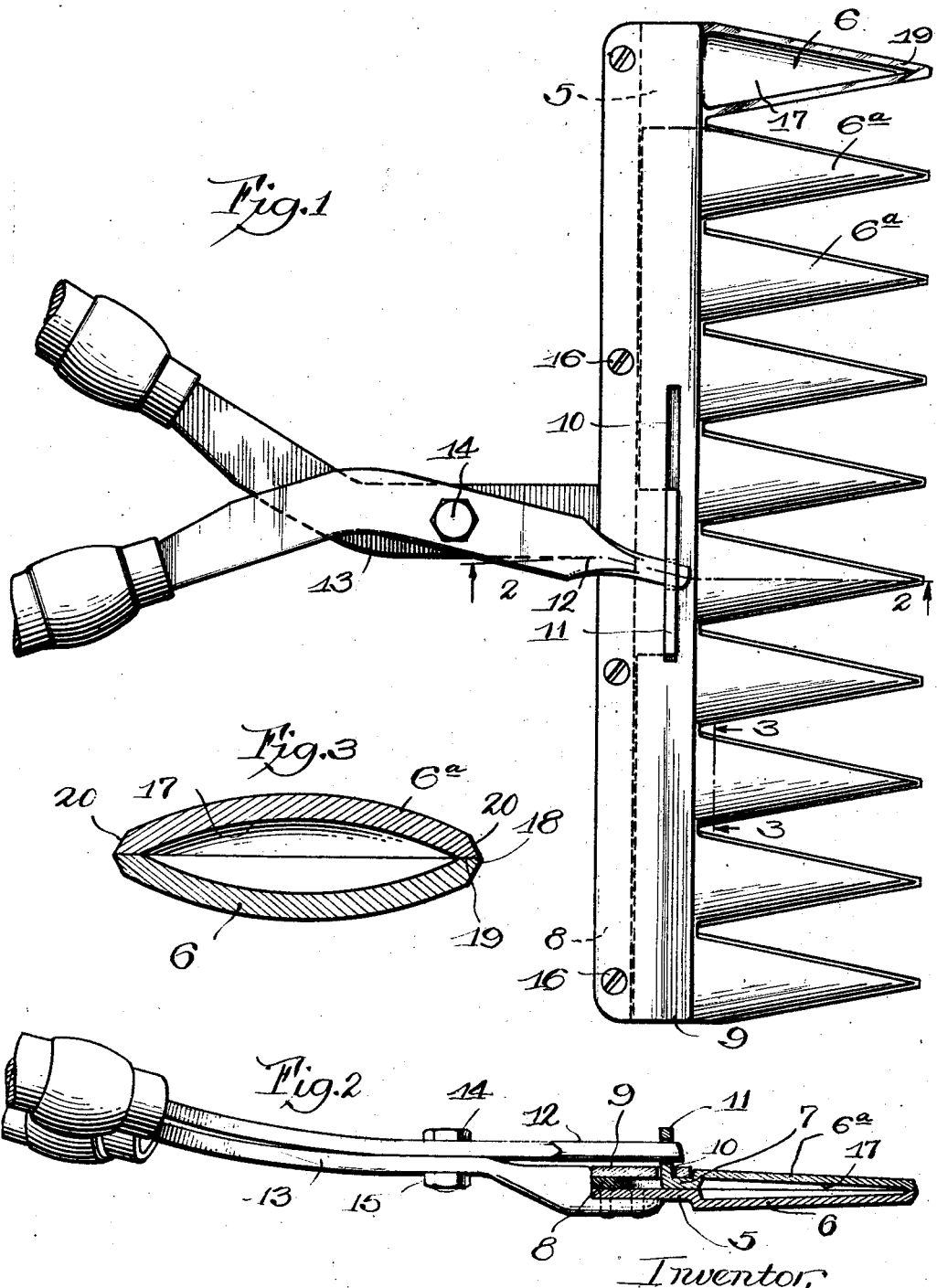
Inventor,
Albert L. Nylander,
Witness:

Patented Jan. 20, 1931

1,789,370

UNITED STATES PATENT OFFICE

ALBERT L. NYLANDER, OF BLUE ISLAND, ILLINOIS

CLIPPERS

Application filed December 2, 1929. Serial No. 410,946.

My present invention relates to improvements in clippers for hedges, the edging of lawns and other uses to which clippers are put and has special reference to the type of clippers having a pair of serrated members, one of which is reciprocated with respect to the other. I believe that this type of clipper has not been entirely satisfactory in the past for divers reasons among which are the considerable friction developed between the serrated members and the liability of the teeth to become bent or separated, which, of course, seriously impairs the efficiency of the shearing.

It has been my object to provide a clipper, the parts of which may largely be made with blanking and forming dies and therefore produced economically, and it has also been my object to greatly stiffen the teeth of the serrated members and reduce the friction developed between these members without increasing the weight of metal required, and in accomplishing these results I have also secured teeth which require much less sharpening as the normal use of the apparatus maintains the shearing edges of the teeth. That is to say, the teeth of my clipper are to an extent self-sharpening.

I accomplish the foregoing objects and attain the above indicated results by means of the structure illustrated in the accompanying drawing in which—

Fig. 1 is a plan of a clipper embodying my invention;

Fig. 2 is a section thereof on line 2—2 of Fig. 1 showing the assembly of the serrated members with the handles; and Fig. 3 is a section on line 3—3 of Fig. 1 transversely of one of the teeth.

Similar reference characters refer to similar parts throughout the respective views.

The cutting members are blanked out and formed from sheets of steel of requisite thickness and hardness, the lower member 5 being provided with teeth 6 upon one edge and extended upon the other edge, as most clearly shown in Fig. 2, to constitute the base of the entire structure. The complementary cutting member 7 is provided with teeth 6a similar in size and shape with the teeth of the lower member. The upper member 7 is sufficiently shorter than the lower member 5 to provide one less tooth than the lower member and is also narrower than the lower member to the extent of the breadth of the spacing strip 8, shown in Fig. 2, between the lower member 5 and the cover or holding down member 9. The holding down member 9 has running longitudinally and centrally thereof a slot 10 through which extends a tongue 11 blanked out from and turned up at right angles to the upper cutting member 7. The tongue 11 is centrally perforated to receive the end of the lever arm 12 for reciprocating the upper cutting member, which upper lever arm constitutes one of the handles of the device. The other handle 13 is pinned or welded or otherwise secured to the under side of the lower cutting member 5 and extends laterally from the central portion thereof. The handles 12 and 13 are pivotally secured together by means of the bolt 14 and nut 15. The under cutting member 5, spacer plate 8 and cover or holding down member 9 are secured together by machine screws 16, or in any other desired way.

For the purpose of reducing the friction between the members 5 and 7 and increasing the stiffness of the teeth 6 and 6a, these teeth are curved or dished transversely and outwardly from their meeting faces, as shown at 17 in Fig. 3, whereby contact between the teeth is eliminated except at the shearing edges 18 and for a relatively small strip 19 immediately adjacent the shearing edges. This dishing may be economically and preferably accomplished with forming dies. The dishing, besides stiffening the teeth and reducing the friction, leaves only a relatively small area 20 requiring sharpening, and, as heretofore explained, the normal functioning of my device tends to keep the shearing edges in a sharp condition and therefore much reduces resharpening.

Having described my invention what I claim is new and desire to secure by Letters Patent is:

A trimmer comprising a lower toothed cutting member, a handle secured thereto, a spacing member and a slotted cover member secured to said cutting member, a second toothed cutting member reciprocably located between said first mentioned cutting member and said cover member and having a perforated tongue extending through the slot of said cover member and a lever arm pivoted to said handle one end whereof co-operates with said perforated tongue.

ALBERT L. NYLANDER.